(12) United States Patent
Sardi Herrera

(10) Patent No.: US 7,464,502 B2
(45) Date of Patent: Dec. 16, 2008

(54) MODULAR FOLDING SHELTER

(76) Inventor: Leon Sardi Herrera, Avenida 5 Norte No. 16N-105, Cali (CO)

( * ) Notice: Subject to any disclaimer, the term of this patent is extended or adjusted under 35 U.S.C. 154(b) by 943 days.

(21) Appl. No.: 10/499,249

(22) PCT Filed: Sep. 27, 2002

(86) PCT No.: PCT/IB02/04378

§ 371 (c)(1),
(2), (4) Date: Jun. 17, 2004

(87) PCT Pub. No.: WO2004/033825

PCT Pub. Date: Apr. 22, 2004

(65) Prior Publication Data

US 2005/0247004 A1    Nov. 10, 2005

(51) Int. Cl.
*E04H 1/02* (2006.01)
*E04H 9/00* (2006.01)

(52) U.S. Cl. .................. 52/79.5; 52/641; 52/649.5; 52/633; 52/652.1; 52/653.1

(58) Field of Classification Search .................. 52/79.5, 52/79.9, 75–77, 633, 641, 645, 649.5, 652.1, 52/653.1; 182/165, 152
See application file for complete search history.

(56) References Cited

U.S. PATENT DOCUMENTS

| | | | |
|---|---|---|---|
| 551,445 A * | 12/1895 | Liefer | 182/173 |
| 737,636 A * | 9/1903 | Latta | 182/167 |
| 791,509 A * | 6/1905 | Soergel | 182/165 |
| 949,614 A * | 2/1910 | Blundell | 182/165 |
| 3,557,500 A * | 1/1971 | Schmidt et al. | 52/69 |
| 3,826,270 A * | 7/1974 | Hentges | 280/19.1 |
| 3,971,185 A * | 7/1976 | Hendrich | 52/745.14 |
| 4,860,855 A * | 8/1989 | Riley | 182/106 |
| 4,926,964 A * | 5/1990 | Herrin | 182/22 |
| 5,167,246 A * | 12/1992 | Mortenson | 135/153 |
| 5,209,030 A * | 5/1993 | Sloditskie et al. | 52/79.5 |
| 6,902,036 B1 * | 6/2005 | Holley | 182/180.2 |
| 2007/0157959 A1 * | 7/2007 | Flynn | 135/123 |

* cited by examiner

*Primary Examiner*—Jeanette Chapman
(74) *Attorney, Agent, or Firm*—Robert M. Schwartz; David W. Barman

(57) ABSTRACT

A modular folding shelter for use in seismic or weather disturbances is disclosed including a first force transferring member having a first plurality of lateral supports, the first plurality of lateral supports including crossmembers, at least one upper articulation point, and at least one lower articulation point, a second force transferring member having a second plurality of lateral supports, the second plurality of lateral supports including crossmembers, at least one upper articulation point, and at least one lower articulation point, a top member for receiving the at least one upper articulation point of the first plurality of lateral supports and the at least one upper articulation point of the second plurality of lateral supports, and a foldable base member for receiving the at least one lower articulation point of the first plurality of lateral supports and the at least one lower articulation point of the second plurality of lateral supports.

16 Claims, 5 Drawing Sheets

MODULAR FOLDING SHELTER

TECHNICAL FIELD

The present invention relates generally to protective, structures for individuals during earthquakes and high wind conditions, including those found in hurricanes, cyclones, and typhoons. In particular, the present invention relates to a modular folding shelter used to protect individuals during seismic or weather disturbances from falling debris or other impacts.

BACKGROUND OF THE INVENTION

During an earthquake or severe weather event individuals, due to an inability to escape from residences or other structures, typically can only select from among the existing indoor equipment for furniture for shelter. However, in a severe earthquake or weather event (such as a tornado) capable of damaging the building structure the above methods of self-preservation are often in vain. Although some victims may survive, they frequently must go through a lengthy waiting period for rescue with no food and water. If these individuals are not timely rescued, large excavation machinery is likely to cause further injury.

It has long been known that one of the safest places to stand in a building or house during an earthquake is under a doorway. The header of the doorway and the corresponding supports tend to be strong enough to support the structure immediately above it, should a portion of the surrounding structure collapse. However, doorways are typically narrow, and, as a consequence, falling objects may still strike an individual standing under the doorway, even if the doorway itself does not collapse. Further, there is typically only room for one or two individuals under the doorway.

Although standing under a doorway during an earthquake is a degree safer than not standing under the doorway, a need exists for a folding modular shelter to protect individuals from falling objects during an earthquake or severe weather event. Such a shelter would be strong enough to withstand a considerable load, such as the structural collapse of the ceiling or roof above the doorway. Further, such a shelter would provide room for several individuals, and would be relatively easy to install on existing structures, such as walls, and additionally would be relatively inexpensive to manufacture.

SUMMARY OF THE INVENTION

The present invention eliminates the above-mentioned needs for a folding modular shelter to protect individuals from falling objects during an earthquake or severe weather event by providing a shelter capable of being folded and stowed on a substrate of a structure.

In accordance with the present invention, there is provided a modular folding shelter for use in seismic or weather disturbances. The modular folding shelter includes a first force transferring member having a first plurality of lateral supports, the first plurality of lateral supports including crossmembers, at least one upper articulation point, and at least one lower articulation point. The modular folding shelter further includes a second force transferring member having a second plurality of lateral supports, the second plurality of lateral supports including crossmembers, at least one upper articulation point, and at least one lower articulation point. The modular folding shelter also includes a top member for receiving the at least one upper articulation point of the first plurality of lateral supports and the at least one upper articulation point of the second plurality of lateral supports, and a foldable base member for receiving the at least one lower articulation point of the first plurality of lateral supports and the at least one lower articulation point of the second plurality of lateral supports.

The present invention is further directed to a method for protecting an individual from a seismic or weather disturbance, the method comprising the steps of attaching a modular folding shelter to a substrate of a structure, securing the modular folding shelter in a folded position, and permitting the individual to unsecure the modular folding shelter to an unfolded position.

DETAILED DESCRIPTION

Figure 1:
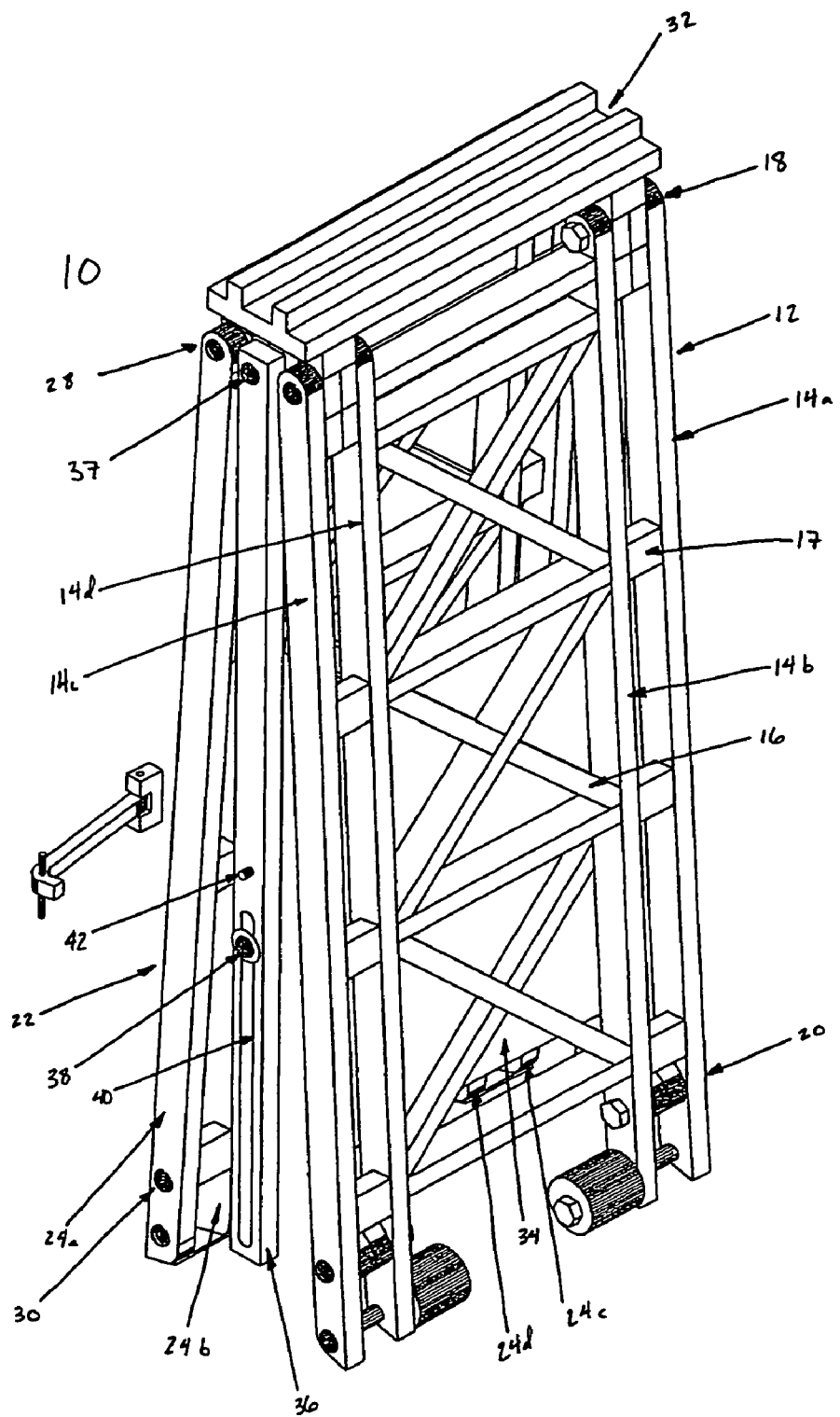
FIG. 1 is an isometric view of the preferred embodiment of the present invention.

Referring now to FIG. 1, a preferred embodiment of the present invention is illustrated as modular folding shelter 10. Modular folding shelter 10 includes first force transferring member 12, second force transferring member 22, top member 32, foldable base member 34, and attachment member 36.

As illustrated in FIG. 1, the preferred embodiment of the present invention is shown in its folded state. First force transferring member 12 includes a first plurality of lateral supports 14*a*, 14*b*, 14*c*, and 14*d*. First plurality of lateral supports 14*a*, 14*b*, 14*c*, and 14*d* also includes crossmembers 16, at least one upper articulation point 18, and at least one lower articulation point 20.

First plurality of lateral supports 14*a*, 14*b*, 14*c*, and 14*d* incorporate crossmembers 16 and connectors 17 to assist in the distribution of force along first force transferring member 12. First plurality of lateral supports 14*a*, 14*b*, 14*c*, and 14*d* attach to top member 32 at articulation points, such as articulation point 18. Articulation point permits first force transferring member 12 to be deployed to an appropriate position for use.

Second force transferring member 22 includes a second plurality of lateral supports 24*a*, 24*b*, 24*c*, and 24*d*. Second plurality of lateral supports 24*a*, 24*b*, 24*c*, and 24*d* also includes crossmembers 16', at least one upper articulation point 28, and at least one lower articulation point 30.

Second plurality of lateral supports 24*a*, 24*b*, 24*c*, and 24*d* incorporate crossmembers 16' and connectors 17' to further assist in the distribution of force along second force transferring member 22. Second plurality of lateral supports 24*a*, 24*b*, 24*c*, and 24*d* attach to top member 32 at articulation points, such as articulation point 28. Articulation point permits second force transferring member 22 to be deployed to an appropriate position for use.

Connected to both first force transferring member 12 and second force transferring member 22 is foldable base member 34. Foldable base member 34, when deployed, provides a surface area for at least one individual to be situated upon. Foldable base member 34 is further connected to attachment member 36.

Attachment member 36 includes at least one upper articulation point 37, at least one lower articulation point 38, articulation slide 40, and at least one panel attachment point 42. Upper articulation point 37 provides a manner of attachment to top member 32, while lower articulation point 38 permits attachment to foldable base member 34. Articulation slide 40 allows lower articulation point 38 to move along an axis of attachment member 36. This movement allows foldable base member to unfold and thus be deployed for use.

Figure 2:
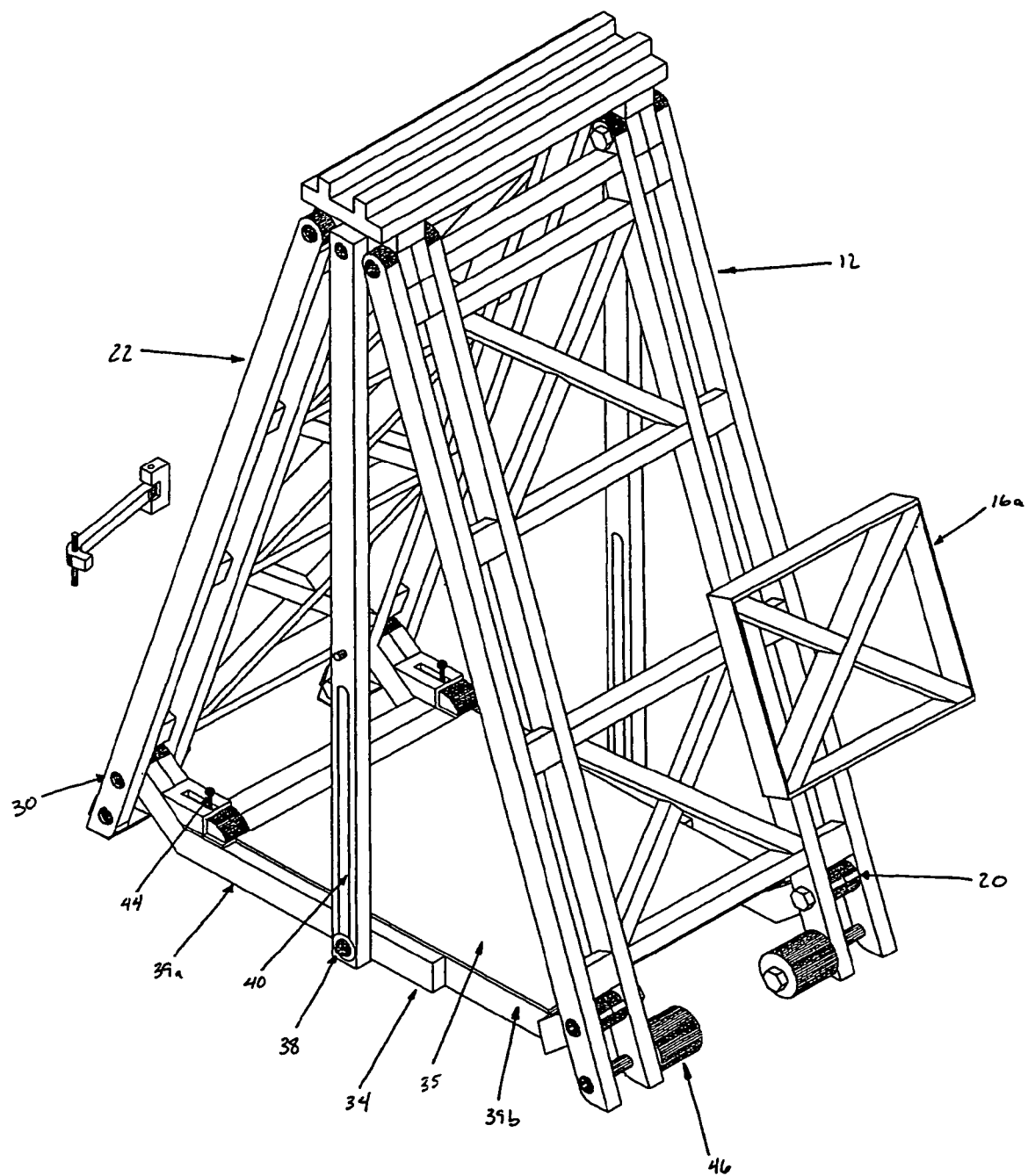
FIG. 2 is an isometric view of the preferred embodiment of the present invention of FIG. 1 shown deployed.

Referring now to FIG. 2, modular folding shelter 10 is shown deployed. To bring modular folding shelter 10 to its deployed position, a user can move first force transferring member 12 to a terminal position as defined by the length of foldable base member 34. Alternatively, first force transferring member 12 and second force transferring member 22 can be spring loaded, thereby automatically deploying to their respective terminal positions upon engagement by the user.

First force transferring member 12 can include wheels 46 to facilitate ease in placement in either the deployed or folded position.

As first force transferring member 12 is deployed, foldable base member 34 travels along articulation slide 40 to a position that is perpendicular to the longitudinal axis of attachment member 36. Foldable base member 34 includes base panel 35 and base member arms 39a and 39b. As lower articulation point 38 travels down articulation slide 40, base member arms 39a and 39b unfold. Lower articulation points 20 and 30 assist this unfolding. Once foldable base member 34 is appropriately positioned, locks, such as lock 44, can be engaged to prevent re-folding of the foldable base member, and therefore preventing re-folding of modular folding shelter 10.

Figure 3:
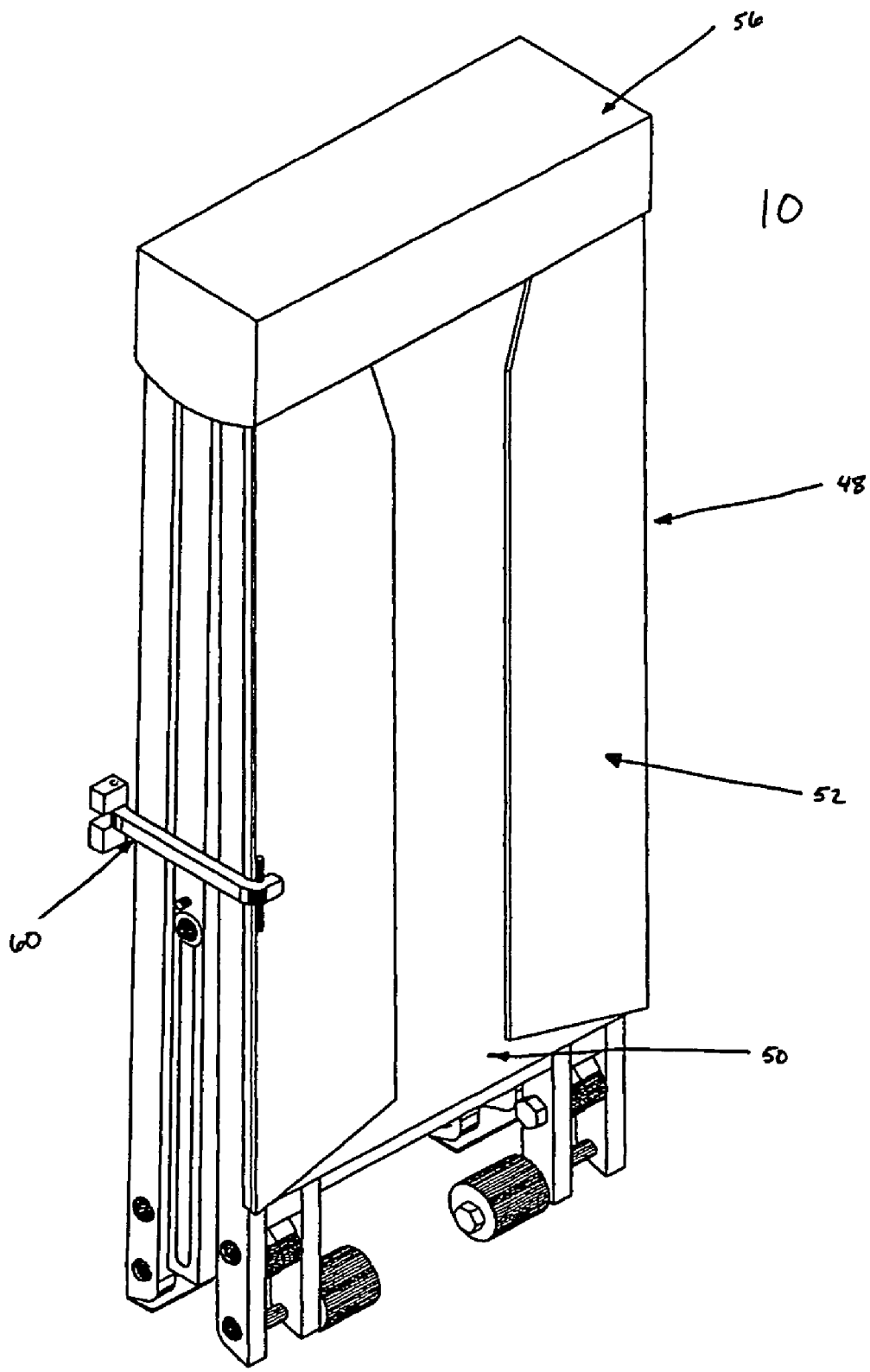
FIG. 3 is an isometric view of an alternative embodiment of the present invention shown in FIG. 1.

Referring now to FIG. 3, an alternative embodiment of the preferred invention is illustrated. As is shown in FIG. 3, modular folding shelter 10 can be secured against a substrate, such as a wall, by securement 60. Securement 60 can be selected from any one of a number of securements well known in the art. Modular folding shelter 10, as illustrated in FIG. 3, can further include protective panel members, such as protective panel member 48.

Protective panel member 48 functions a barrier to prevent debris or other materials from entering the area internal to modular folding shelter 10, thus assisting in the prevention of injury to the user. Protective panel member 48 can incorporate numerous protective portions, such as face portion 50 and first side portion 52. Additionally, protective cover 56 can be utilized to protect top member 32 from damage or further prevent debris from entering the space occupied by the user.

Figure 4:
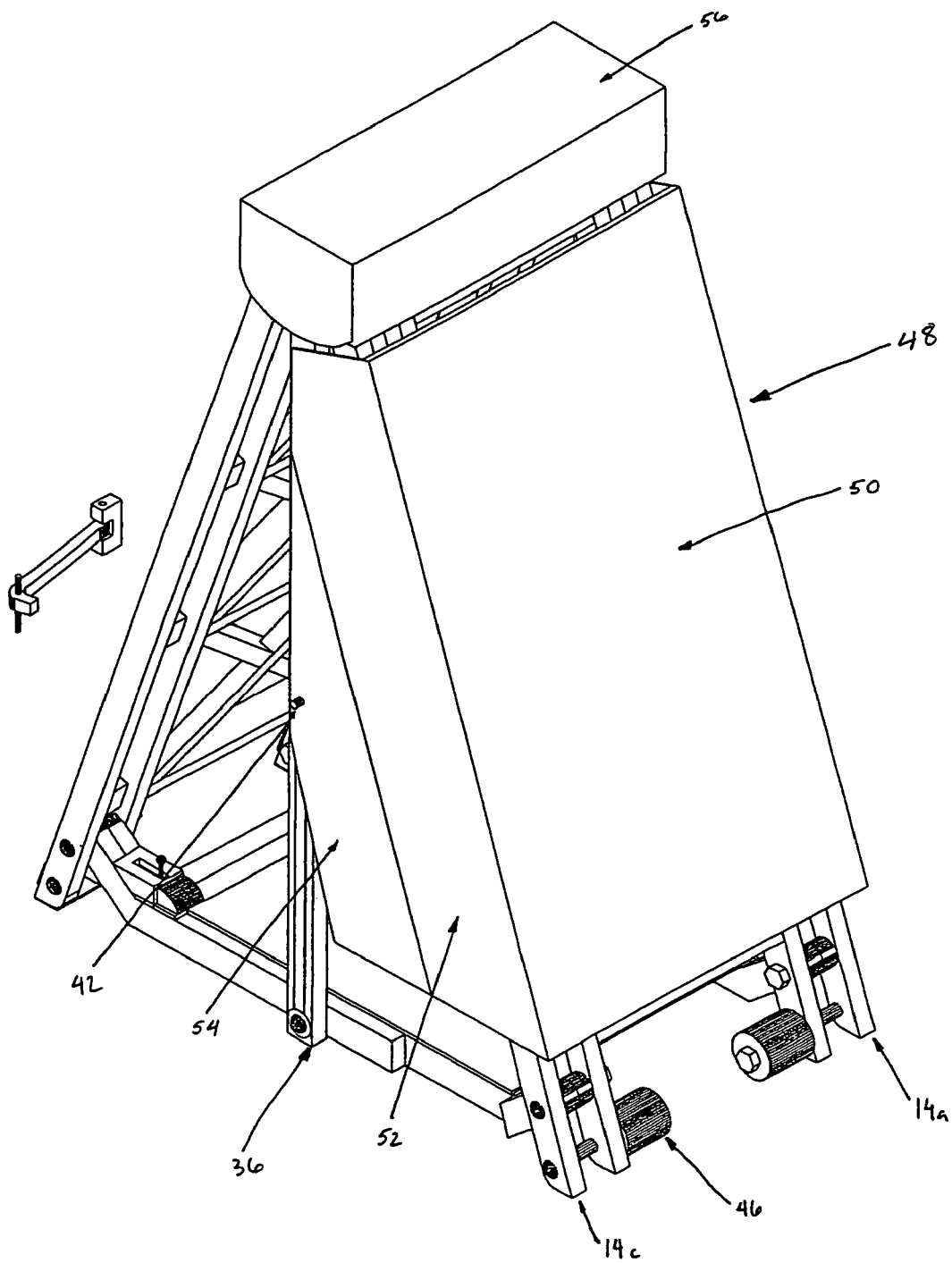
FIG. 4 is an isometric view of an alternative embodiment of the present invention of FIG. 2 shown deployed.

In use, as is illustrated in FIG. 4, protective panel member 48 can be unfolded around first force transferring member 12. This would result in face portion 50 covering an outer surface of first force transferring member 12, while first side portion 52 can be folded over the outer sides of lateral supports 14a and 14c to provide a protective barrier to prevent debris or other materials from entering the area internal to modular folding shelter 10. Second side portion 54 further assists first side portion 52 in its protective function. Second side portion 54 attaches to panel attachment 42 of attachment member 36 in a releasable fashion, thereby permitting re-folding of first side portion 52 and second side portion 54.

It is contemplated that an additional protective panel member can be employed to cover second force transferring member 22 in a manner substantially similar to the utilization of protective panel member 48.

Once deployed, the users reside in the internal spatial area formed by modular folding structure 10 until the seismic or weather event subsides, or until rescue.

Figure 5:
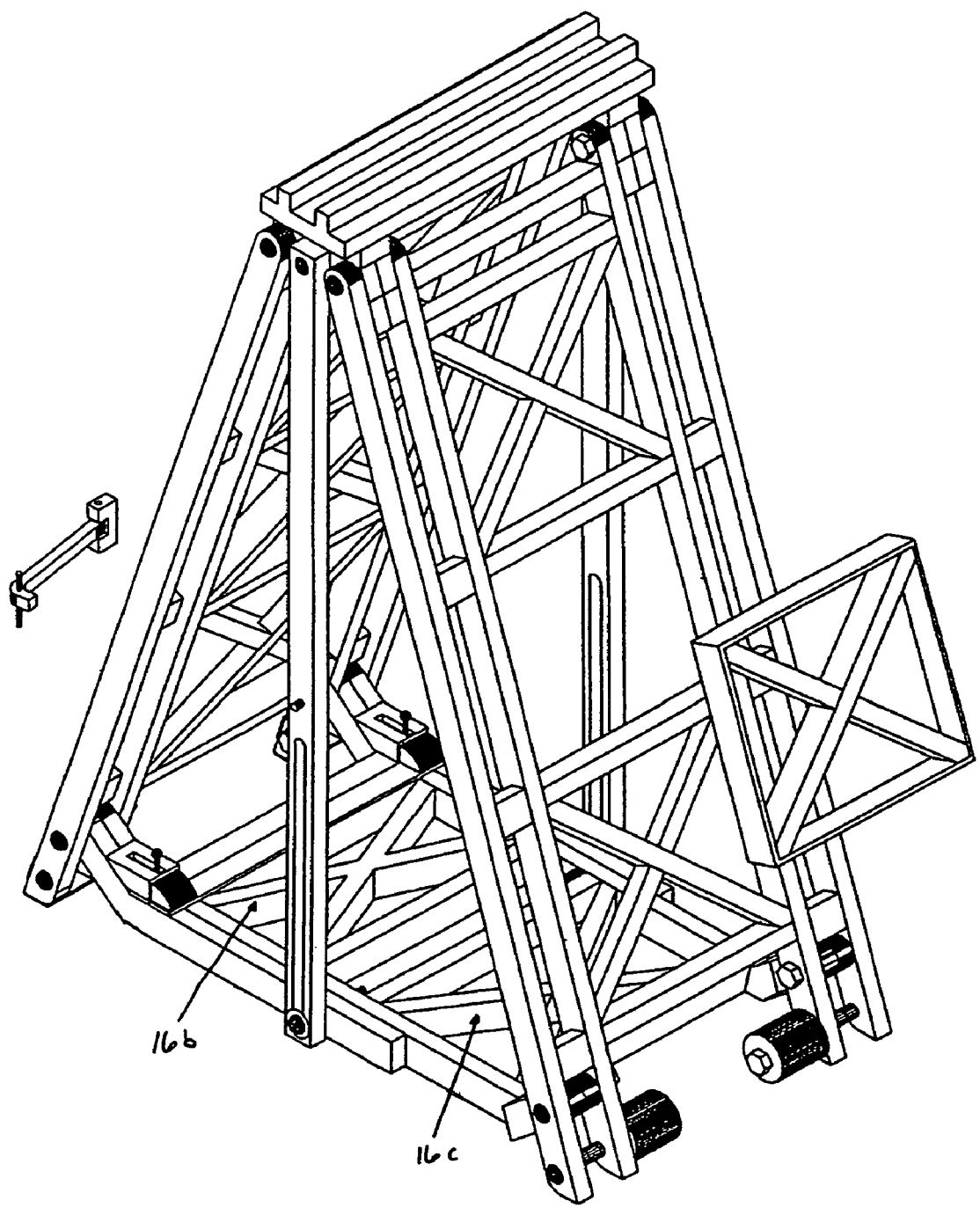
FIG. 5 is an isometric view of another alternative embodiment of the present invention of FIG. 2

Alternatively, as is illustrated in FIG. 5, foldable base member 34 can be substituted for load-bearing crossmembers 16b and 16c. Crossmembers 16b and 16c can be similar or identical to crossmembers 16 shown in FIG. 2. Incorporating crossmembers 16b and 16c can reduce the weight of modular folding shelter 10 and serve the additional purpose of enhancing structural support.

Although only a few exemplary embodiments of the present invention have been described in detail above, those skilled in the art will readily appreciate that numerous modifications are to the exemplary embodiments are possible without materially departing from the novel teachings and advantages of this invention. Accordingly, all such modifications are intended to be included within the scope of this invention as defined in the following numbered claims.

What is claimed is:

1. A modular folding shelter for use in seismic or weather disturbances, comprising: a first force transferring member having a first plurality of lateral supports, said first plurality of lateral supports including crossmembers, at least one upper articulation point, and at least one lower articulation point; a second force transferring member having a second plurality of lateral supports, said second plurality of lateral supports including crossmembers, at least one upper articulation point, and at least one lower articulation point; a top member for receiving said at least one upper articulation point of said first plurality of lateral supports and said at least one upper articulation point of said second plurality of lateral supports; a foldable base member for receiving said at least one lower articulation point of said first plurality of lateral supports and said at least one lower articulation point of said second plurality of lateral supports; and at least one panel attachment member having at least one upper articulation point, at least one lower articulation point, and at least one panel attachment point.

2. The modular folding shelter according to claim 1 wherein said first force transferring member further includes a first protective panel member.

3. The modular folding shelter according to claim 2 wherein said first protective panel member is secured to said at least one panel attachment point.

4. The modular folding shelter according to claim 3 wherein said first protective panel member is foldable.

5. The modular folding shelter according to claim 1 wherein said second force transferring member further includes a second protective panel member.

6. The modular folding shelter according to claim 5 wherein said second protective panel member is secured to said at least one panel attachment point.

7. The modular folding shelter according to claim 6 wherein said second protective panel member is foldable.

8. The modular folding shelter according to claim 1 wherein said first force transferring member, second force transferring member, top member, and foldable base member are arranged to define a shelter area.

9. A modular folding shelter for use in seismic or weather disturbances, comprising: a first force transferring member having a first plurality of lateral supports, said first plurality of lateral supports including crossmembers, at least one upper articulation point, and at least one lower articulation point; a second force transferring member having a second plurality of lateral supports, said second plurality of lateral supports including crossmembers, at least one upper articulation point, and at least one lower articulation point; at least one panel attachment member having at least one upper articulation point, at least one lower articulation point, and at least one panel attachment point; a top member for receiving said at least one upper articulation point of said first plurality of lateral supports, said at least one upper articulation point of said second plurality of lateral supports, and said at least one upper articulation point of said at least one panel attachment member; and a foldable base member for receiving said at least one lower articulation point of said first plurality of lateral supports, said at least one lower articulation point of said second plurality of lateral supports, and said at least one lower articulation point of said at least one panel attachment member.

10. The modular folding shelter according to claim 9 wherein said first force transferring member further includes a first protective panel member.

11. The modular folding shelter according to claim 10 wherein said first protective panel member is secured to said at least one panel attachment point.

12. The modular folding shelter according to claim 11 wherein said first protective panel member is foldable.

13. The modular folding shelter according to claim 10 wherein said second force transferring member further includes a second protective panel member.

14. The modular folding shelter according to claim 13 wherein said second protective panel member is secured to said at least one panel attachment point.

15. The modular folding shelter according to claim 14 wherein said second protective panel member is foldable.

16. The modular folding shelter according to claim 9 wherein said first force transferring member, second force transferring member, top member, and foldable base member are arranged to define a shelter area.

\* \* \* \* \*